United States Patent [19]
Chang

[11] Patent Number: 6,068,516
[45] Date of Patent: May 30, 2000

[54] CARD CONNECTOR HAVING ANTI-DISORIENTATION MEANS

[75] Inventor: Jen-Jou Chang, Yung-Ho, Taiwan

[73] Assignee: Hon Hai Precision Ind. Co., Ltd., Taipei Hsien, Taiwan

[21] Appl. No.: 09/185,232

[22] Filed: Nov. 3, 1998

[30] Foreign Application Priority Data

Nov. 3, 1997 [TW] Taiwan .................................. 86218621

[51] Int. Cl.$^7$ .................................................. H01R 24/00
[52] U.S. Cl. ............................ 439/633; 439/946; 235/441
[58] Field of Search ............................ 439/633, 44, 946; 235/441

[56] References Cited

U.S. PATENT DOCUMENTS 5,231,274  7/1993  Reynier et al. .......................... 235/441
5,743,766  4/1998  Kaneshige et al. ...................... 235/441
5,894,597  4/1999  Schwartz et al. ....................... 235/441
5,898,159  4/1999  Huang ..................................... 235/441

*Primary Examiner*—Lincoln Donovan
*Assistant Examiner*—Hae Moon Hyeon

[57] ABSTRACT

A card connector comprises a base, a cover, anti-disorientation means, and a plurality of conductive contacts. The anti-disorientation means is formed to have a concave bottom edge and tapered side edges, wherein the inner side edge is shorter then the outer side edge. A card defining a notch in a front corner thereof is inserted into the card connector. When the card is properly inserted into the connector, the configuration of the notch and the bottom edge of the anti-disorientation means will allow the card to bypass the anti-disorientation means. When the card is improperly inserted into the connector, a corner of the card will abut against the anti-disorientation means thereby prohibiting the card from being further inserted into the connector.

10 Claims, 5 Drawing Sheets

CARD CONNECTOR HAVING ANTI-DISORIENTATION MEANS

BACKGROUND OF THE INVENTION

1. Field of the Invention

The present invention relates to a card connector, and particularly to a card connector having anti-disorientation means for properly receiving an IC card inserted therein.

2. The Prior Art

IC cards are commonly inserted into card connectors of portable computers for expanding the memory or enhancing the function thereof. Anti-disorientation means is provided to ensure proper insertion of the card into a reception slot of the connector. A conventional anti-disorientation means comprises a protrusion formed on each lateral edge of the card corresponding with guiding grooves defined in the slot of the connector as disclosed in U.S. Pat. No. 5,155,663. When the card is incorrectly inserted into the slot the protrusions will interfere with the grooves thereby preventing complete insertion of the card.

U.S. Pat. No. 4,864,116 discloses a card defining a pair of recesses along a length thereof for receiving aligned protrusions asymmetrically formed in a slot of a connector. Similarly, U.S. Pat. No. 5,483,422 defines a notch in a corner of a card. When the card is improperly inserted into the corresponding connector, a protrusion will engage with an opposite corner of the card thereby preventing further insertion thereof.

The anti-disorientation means disclosed in U.S. Pat. No. 5,668,365 comprises a card having a cutout defined in a corner of a leading edge thereof and a connector forming a lock claw extending into a slot defined therein. When the card is improperly inserted into the slot of the connector, the lock claw abuts against the cutout which prevents the card from engaging with contacts of the connector.

The disclosures mentioned above prevent improper insertion of a card into a corresponding card connector. However, the card must be almost entirely inserted into the connector before the anti-disorientation means is activated which may cause a user to force the card into position thereby damaging the card or the connector. In addition, the structure of the connectors disclosed above are complicated which increases manufacturing costs thereof. Hence, an improved card connector having anti-disorientation means is requisite to eliminate the above mentioned defects of current card connectors.

SUMMARY OF THE INVENTION

Accordingly, an objective of the present invention is to provide a card connector having anti-disorientation means for preventing improper insertion of a card into the connector whereby the anti-disorientation means is activated after the card is inserted into the connector a small distance.

Another objective of the present invention is to provide a card connector having anti-disorientation means of a simple structure thereby reducing manufacturing costs of the connector.

To fulfill the above mentioned objectives, according to a preferred embodiment of the present invention, a card connector comprises a base, a cover, anti-disorientation means, and a plurality of conductive contacts. The anti-disorientation means extends downwardly from the cover and has a curved portion and tapered side edges, wherein the inner side edge is shorter than the outer side edge. An electrical card defining a notch in a front corner thereof is inserted into the card connector. When the card is properly inserted into the connector, the configuration of the notch and the curved portion of the anti-disorientation means will allow the card to bypass the anti-disorientation means. When the card is improperly inserted into the connector, a corner of the card will abut against the anti-disorientation means thereby prohibiting the card from being further inserted into the connector.

These and additional objectives, features, and advantages of the present invention will become apparent after reading the following detailed description of the preferred embodiments of the invention taken in conjunction with the appended drawing figures.

DETAILED DESCRIPTION OF THE PREFERRED EMBODIMENT

Reference will now be made in detail to the preferred embodiment of the present invention.

Figure 1:
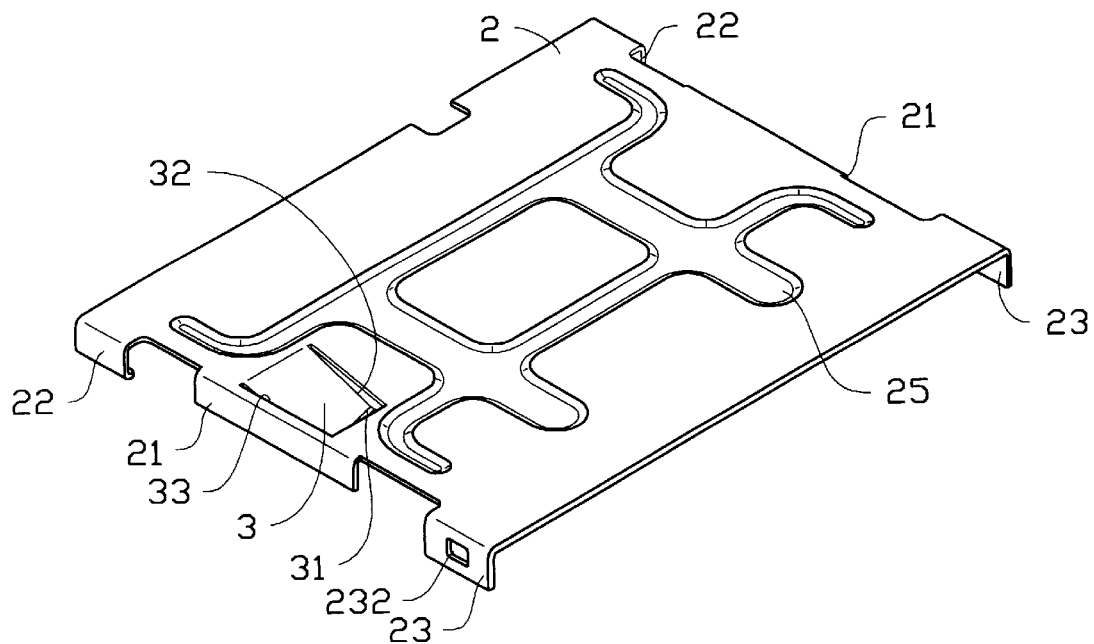
FIG. 1 is an exploded view of a card connector in accordance with a preferred embodiment of the present invention.
Figure 1:
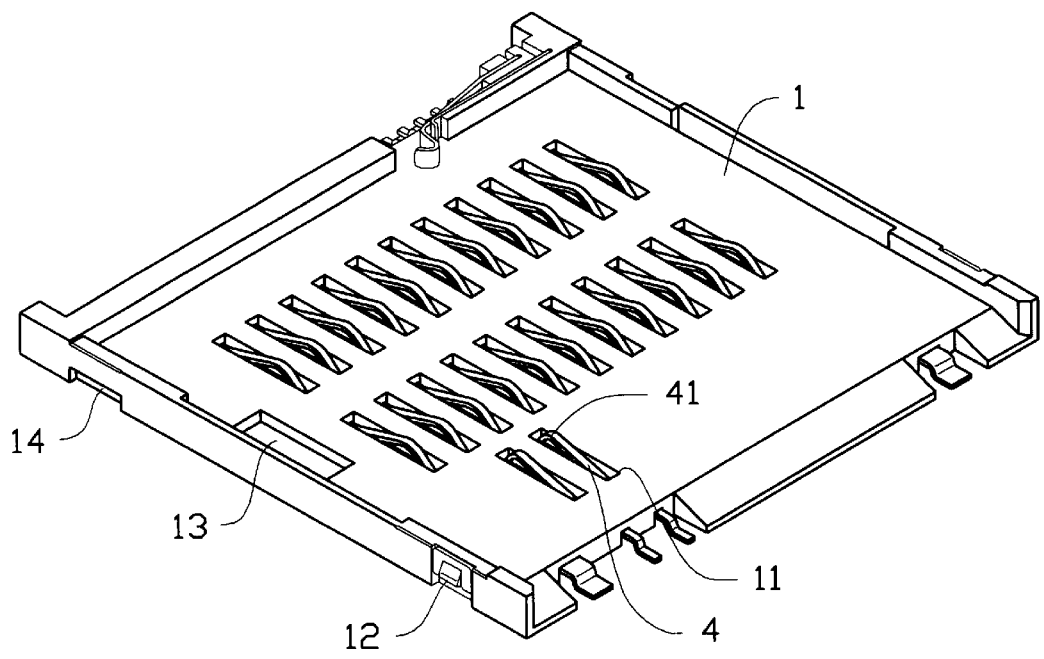

Referring to FIG. 1, a card connector in accordance with the present invention comprises a base 1, a cover 2, anti-disorientation means 3, and a plurality of conductive contacts 4. The base 1 defines a plurality of passageways 11 therethrough for receiving the contacts 4. Contact portions 41 of the contacts 4 extend beyond a surface of the base 1 for engaging with contact pads formed on an inserted card (not shown). The base 1 has side walls each forming a cutout 14 at a rear end thereof and a protrusion 12 at a front end thereof. A recess 13 is defined on a top surface of the base 1 near one of the side walls.

The cover 2 is made of metal and has central portions 21, rear portions 22, and front portions 23 extending downward from opposite sides thereof. A hole 232 is defined in each front portion 23. A channeled depression 25 is formed on a top surface of the cover 2. The base 1 and the cover 2 commonly define a cavity 24 therebetween to receive the card 5 (FIGS. 3A, 3B and 4) therein. The anti-disorientation means 3 is formed by stamping and bending the cover 2 whereby the anti-disorientation means 3 essentially is a tang projecting downward from the cover 2. The anti-disorientation means 3 is formed with a curved portion 31 and tapered side edges 32, 33, wherein the bottom edge 31 substantially protrudes into the cavity 24, and the inner side edge 32 is shorter than the outer side edge 33.

Figure 2:
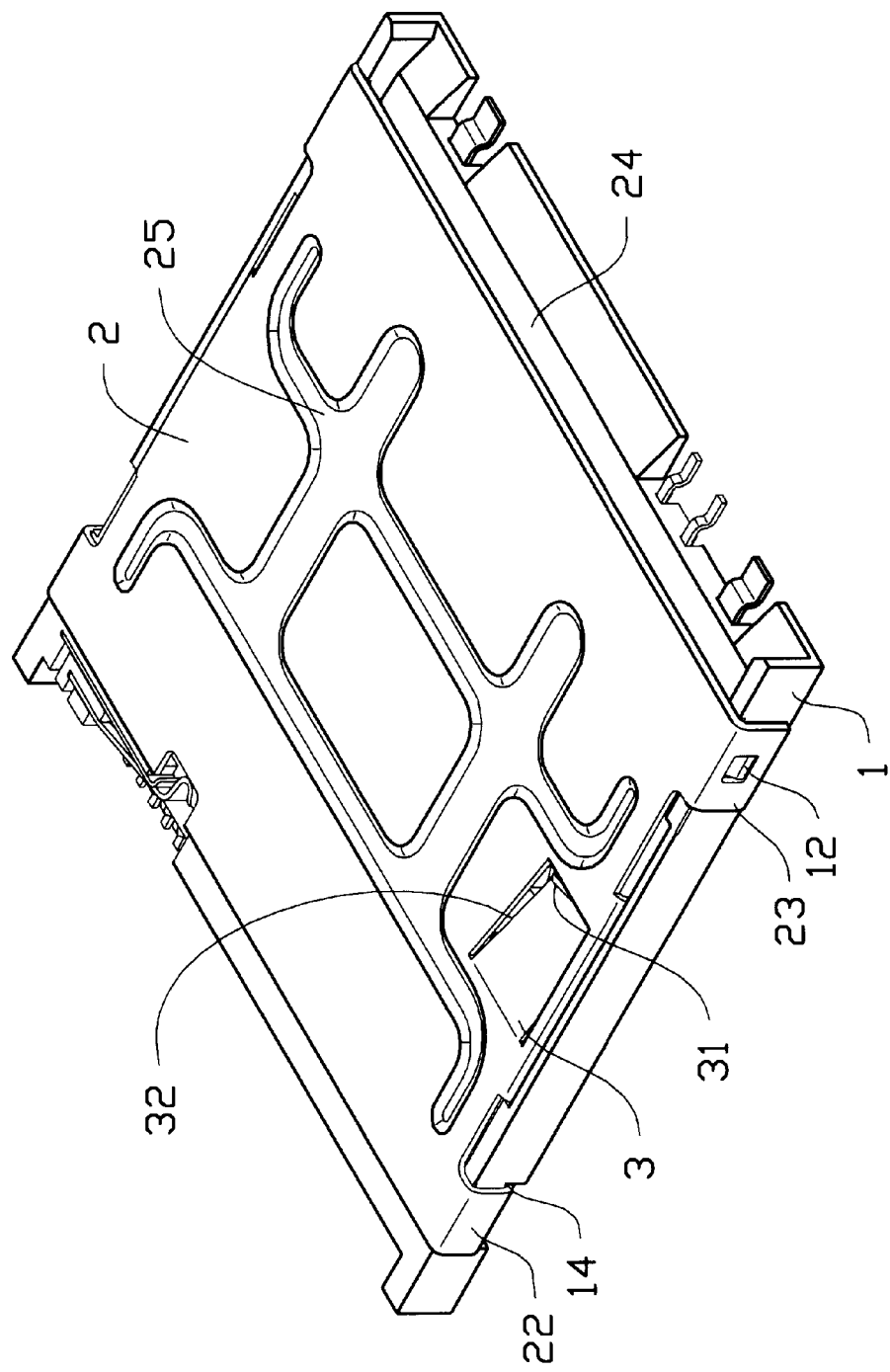
FIG. 2 is an assembled view of FIG. 1.

In assembly, the rear portions 22 of cover 2 are received in the cutouts 14 of the base 1, and the protrusions 12 of the base 1 are received in the holes 232 of the cover 2. The anti-disorientation means 3 generally extends from the cover to a position above the recess 13 of the base 1 while the lowest point of the curved portion projects into the recess 13. A card insertion cavity 24 is defined between the base 1 and the cover 2 as shown in FIG. 2. When a card 5 (FIG. 3) is entirely received in the cavity 24, the provision of the depression 25 will urge the card 5 against the contacts 4 for facilitating a firm electrical engagement therebetween.

Figure 3A:
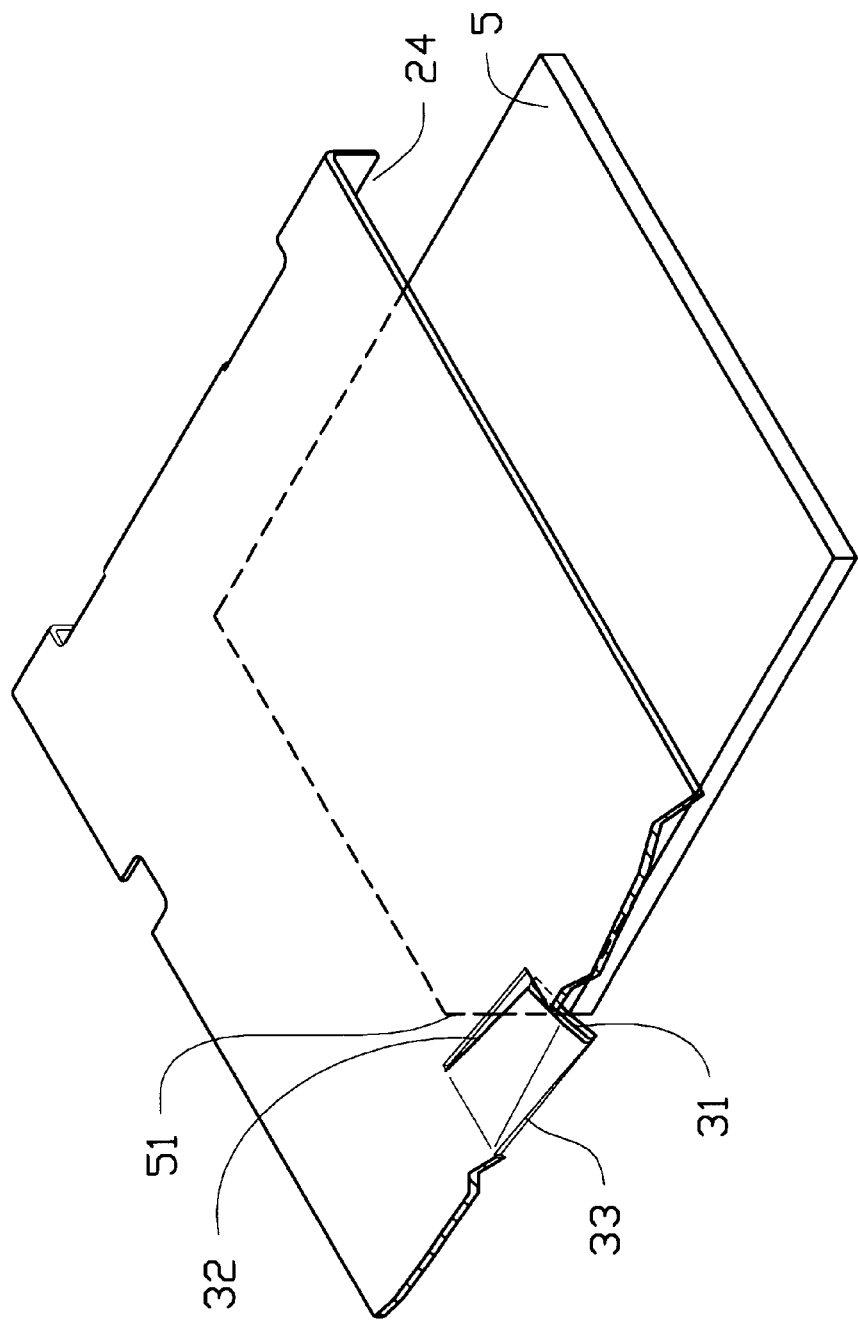
FIG. 3A is a schematic view of a card being properly inserted into the card connector at an initial stage.
Figure 3B:
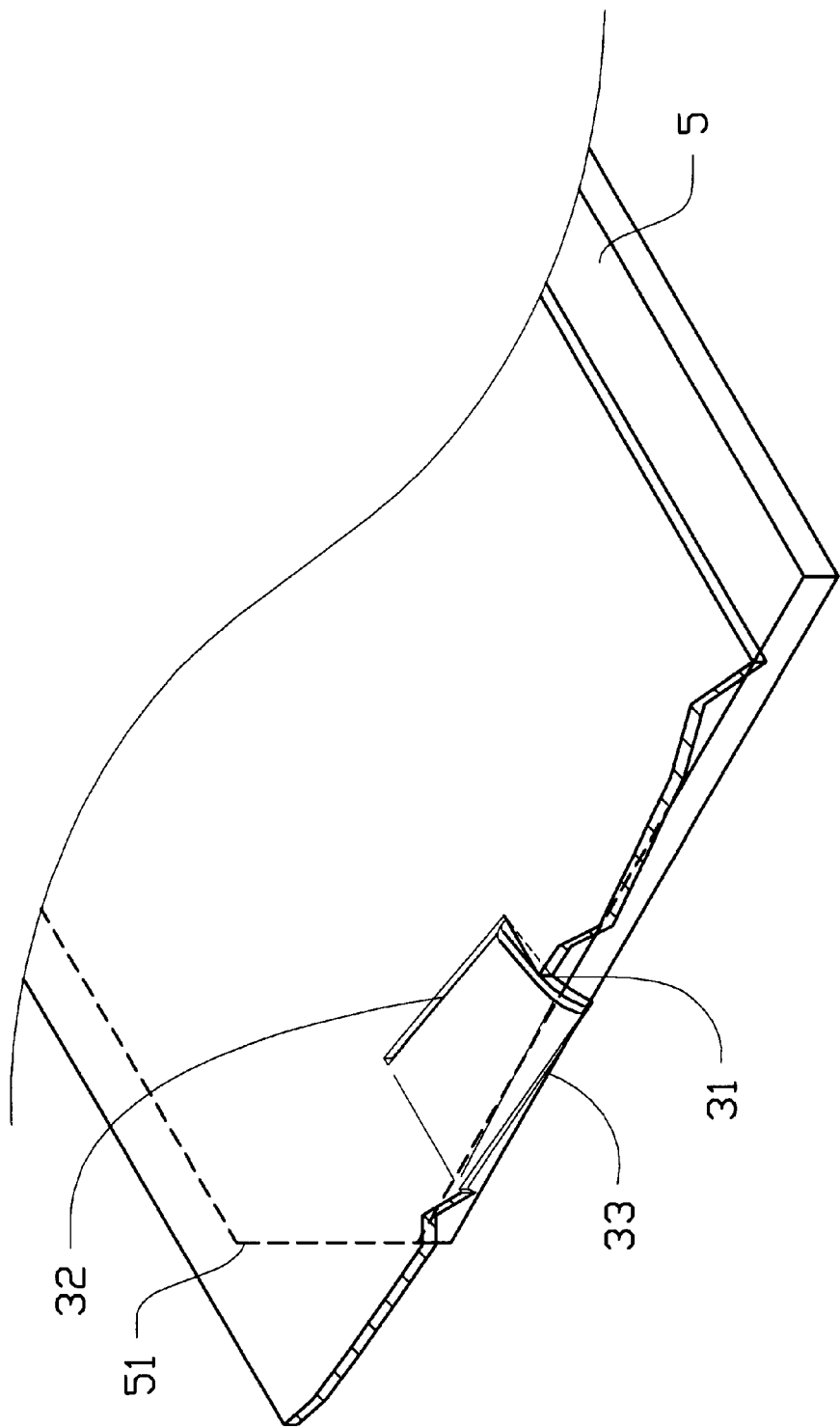
FIG. 3B is a schematic view of a card being inserted into the card connector at a later stage.

Referring to FIG. 3A, an electrical card 5 is formed having a notch 51 in a front corner thereof. When the card 5 is properly inserted into the cavity 24, the portion around the notch 51 may first engage the side edge 32 and urge it to move upward, thus avoiding interferential abutment between the card and the curved portion 31 and allow the card 5 to bypass the anti-disorientation means 3 without obstructing the movement thereof as seen in FIG. 3B.

Figure 4:
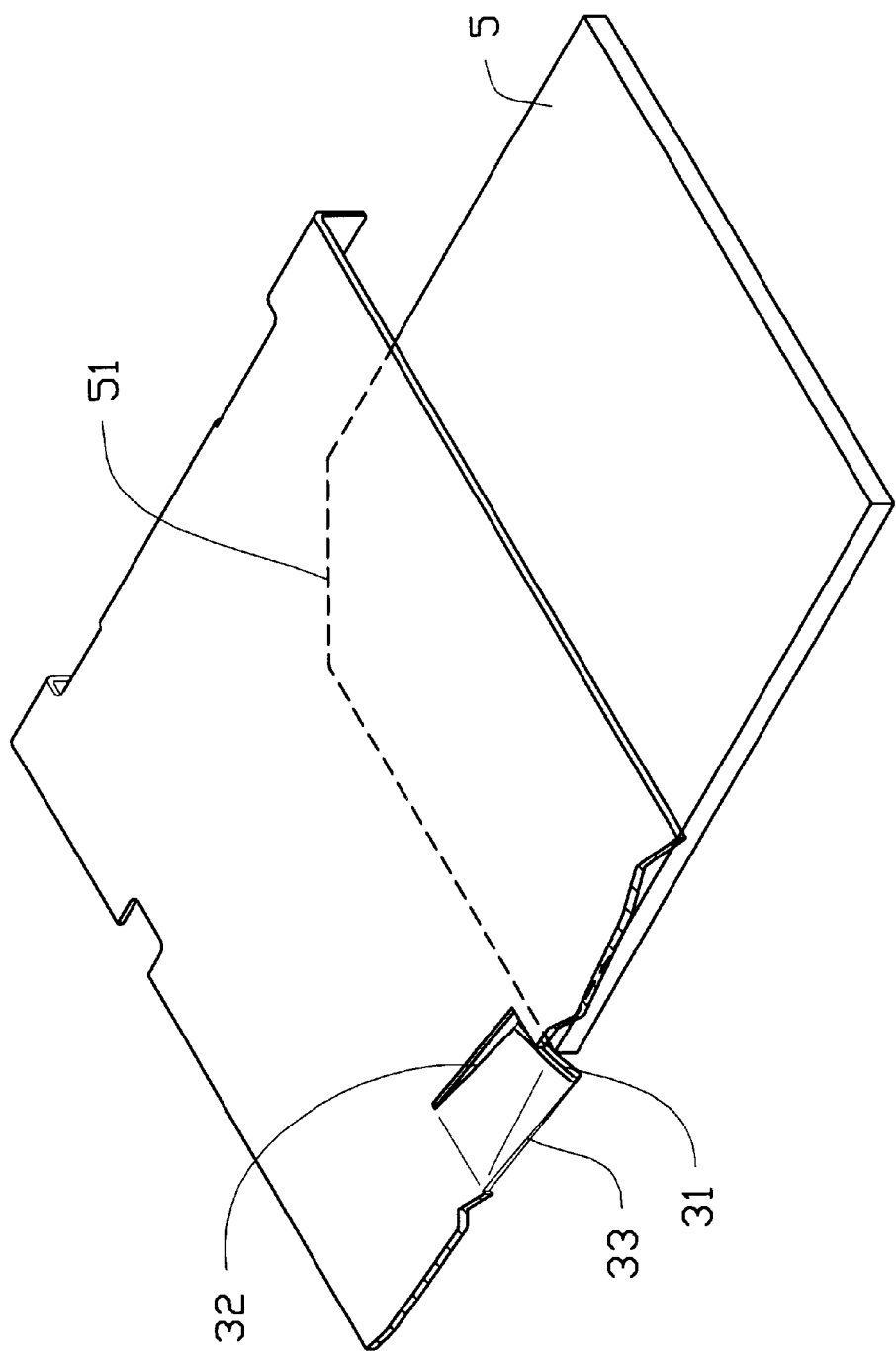
FIG. 4 is a schematic view of a card being improperly inserted into the card connector.

When the card 5 is improperly inserted into the cavity 24, as shown in FIG. 4, a front edge around a right angle corner of the card 5 will face to face abut against the curved portion 31 of the anti-disorientation means 3 thereby prohibiting the card 5 from being further inserted into the cavity 24.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

I claim:

1. A card connector for receiving an electrical card defining a notch in one of opposite front corners thereof, comprising:

a base defining a plurality of passageways therethrough;

a plurality of contacts received in the passageways of the base, said contacts engaging with contact pads formed on the electrical card;

a cover engaging with the base and defining a card insertion cavity therebetween, a front opening being formed at a forward side of the cavity; and an anti-disorientation means situated adjacent to a side of the base and extending from the cover into the cavity in a forward direction toward the front opening of the cavity, said anti-disorientation means forming a curved portion substantially inwardly protruding from the cover into the card insertion cavity for abutting against the electrical card thereby prohibiting the card from being further inserted when the card is improperly inserted into the card connector with the corner without the notch thereof facing the anti-disorientation means, and two tapered side edges, one side edge of the anti-disorientation means being longer than the other side edge thereof, when the card is properly inserted, a portion of the card around the notch of the card engages and moves the shorter side edge of the anti-disorientation means upward thereby allowing the card to bypass the anti-disorientation means.

2. The card as described in claim 1, wherein a recess is defined on a top surface of the base near a side wall thereof for allowing the lowest point of the curved portion of the anti-disorientation means to project thereinto.

3. The card connector as described in claim 2, wherein the anti-disorientation means extends from the cover to a position above the recess of the base.

4. The card connector as described in claim 1, wherein a channeled depression is formed on a top surface of the cover for urging the card against the contacts thereby facilitating a firm electrical engagement therebetween.

5. The anti-disorientation means as described in claim 1, wherein the longer side edge is proximate the side wall of the base.

6. Anti-disorientation means for ensuring the proper orientation of an electrical card inserted into a cavity of a card connector, comprising:

a tang extending from a cover of the connector into the cavity thereof proximate a side wall of the connector, and forming a curved portion and tapered side edges, the side edge of the tang proximate the side wall of the connector being longer than the other side edge thereof; and a notch defined in a corner of the card;

whereby when the card is improperly inserted into the cavity, a corner of the card will abut against the bottom edge of the tang thereby prohibiting the card from being further inserted into the cavity.

7. The anti-disorientation means as described in claim 6, wherein a channeled depression is formed on a top surface of the cover for urging the card against contacts mounted on the connector thereby facilitating a firm electrical engagement therebetween.

8. An arrangement for correct installation of a card into a connector, comprising:

a base and a cover commonly defining a card receiving cavity therebetween for receiving said card therein;

an anti-disorientation means provided on said cover, said anti-disorientation means defining at least a curved portion and a side edge; and said card including a notch and a right angle configuration around two opposite front corners; whereby when the card is correctly inserted into the cavity, the notch of the card first engages with said side edge to urge the anti-disorientation means to move upward without being obstructed by the curved portion so that the card can be completely received within the cavity, while when card is incorrectly inserted into the cavity, the right angle corner of the card is obstructed by the curved portion so that the card can not be further inserted into the cavity.

9. The arrangement as described in claim 8, wherein said anti-disorientation means is a tang extending from the cover.

10. The arrangement as described in claim 8, wherein a channel depression is formed on a top surface of the cover for urging the card against contacts mounted on the base thereby facilitating a firm electrical engagement therebetween.

\* \* \* \* \*